United States Patent

[11] 3,566,763

[72] Inventor George S. Knopf
Dayton, Ohio
[21] Appl. No. 734,752
[22] Filed June 5, 1968
[45] Patented Mar. 2, 1971
[73] Assignee The Bendix Corporation

[54] DISPLACEMENT RESPONSIVE APPARATUS FOR PRODUCING PATTERNS ON A PHOTOSENSITIVE SURFACE
7 Claims, 2 Drawing Figs.

[52] U.S. Cl. .......... 95/1, 355/53, 355/95
[51] Int. Cl. .......... G03
[50] Field of Search .......... 95/1, 12; 355/53, 69, 95, 40, 86, 18

[56] References Cited
UNITED STATES PATENTS
3,323,414 6/1967 Ritchie et al. .......... 95/12
3,445,921 5/1969 Leenhouts .......... 95/1(X)
3,460,448 8/1969 Oliver .......... 95/1

*Primary Examiner*—John M. Horan
*Assistant Examiner*—Richard L. Moses
*Attorneys*—Eugene C. Goodale and Plante, Arens, Hartz and O'Brien

ABSTRACT: An apparatus for producing uniform patterns on a photosensitive surface by triggering a light source at intervals determined by the change in displacement of the photosensitive surface relative to the light source. The light source illuminates a predetermined portion of the surface at intervals determined by the change in displacement of the photosensitive surface relative to the light source. A counting mechanism receives an electrical pulse for each equal increment of movement between light source and surface and counts the pulses. After counting a predetermined number of pulses, it produces an output signal which activates the light source.

Patented March 2, 1971 3,566,763

INVENTOR.
GEORGE S. KNOPF

BY

Eugene C. Goodale

ATTORNEY

DISPLACEMENT RESPONSIVE APPARATUS FOR PRODUCING PATTERNS ON A PHOTOSENSITIVE SURFACE

BACKGROUND OF THE INVENTION

1. Field of Invention

This invention relates to an apparatus for producing patterns upon a photosensitive surface, and more particularly for an apparatus for producing patterns of uniform density upon a photosensitive surface relatively movable with respect to a source of illumination wherein the exposure rate is independent of both the relative speed of movement and the relative distance travelled.

2. Description of the Prior Art

In recent years increased emphasis on microminiaturized electronic circuitry and high density data storage has caused industry to search for a method of producing these microminiaturized circuits at a less expensive price without detracting from the high precision required.

In the past, the circuits and patterns were first produced several hundred times oversize and then reduced through the use of expensive microphotographic cameras. The original enlarged patterns were generally prepared by the use of ink pens, knives, or any sharp instrument. However, this caused a problem in maintaining a precise edge and uniform width of the pattern being produced. If the instrument was manually operated, it was almost impossible to maintain a constant pressure so as to get a constant width of the pattern. If the instrument was mechanized, elaborate and expensive drive motors were required so as to be able to lower the instrument to contact the surface, start the instrument moving along the pattern desired and then stop and raise the instrument at the termination of the desired pattern. The sharpness of the cutting instrument was also critical in the mechanized apparatus.

The use of image transmission to a photosensitive surface in the shape of a pattern desired allowed industry to prepare the original work on a much smaller scale than was required for the previously mentioned method. However, in the prior devices, overexposure and underexposure of the photosensitive surface was a critical problem. Complex and costly electrical components and circuits were required to insure that the light source intensity would vary as the rate of speed between the light source and photosensitive surface varied. To prevent an overexposure, the intensity of the light source had to be correspondingly reduced as the relative speed was reduced, and when the relative speed was increased the light source had to be appropriately increased.

The present invention provides a novel apparatus for constructing a precision pattern having exact predetermined dimensions upon a photosensitive surface such that the image may be formed on a 1 to 1 dimensional scale wherein reduction of the exposed image is not required, and which exposed pattern is characterized by uniform density. The intensity of the light source pulses remains constant while the frequency of illumination is controlled depending upon the increment of relative movement between the light source and the photosensitive material and is independent of speed of movement.

SUMMARY OF THE INVENTION

An apparatus is provided wherein patterns or images of predetermined shape are formed on a photosensitive surface at predetermined dimensional increments and each such pattern or image is identical in shape, exposure and density. These patterns are produced on the photosensitive surface by transmission of light through a reticle or aperture onto the photosensitive surface. The light source employed is a high intensity lamp which produces short pulses of light for each predetermined increment of relative movement between the light source and the photosensitive surface. Intermittent and irregular movement with respect to speed does not affect the energy in each light pulse or the position of each image. The pattern placed on the photosensitive surface can be individual and discrete or can be used in combination to form other patterns.

DESCRIPTION OF THE DRAWINGS

An illustrative embodiment of the present invention is shown in the following drawings, in which.

DESCRIPTION OF THE PREFERRED EMBODIMENT

Figures 1, 2:
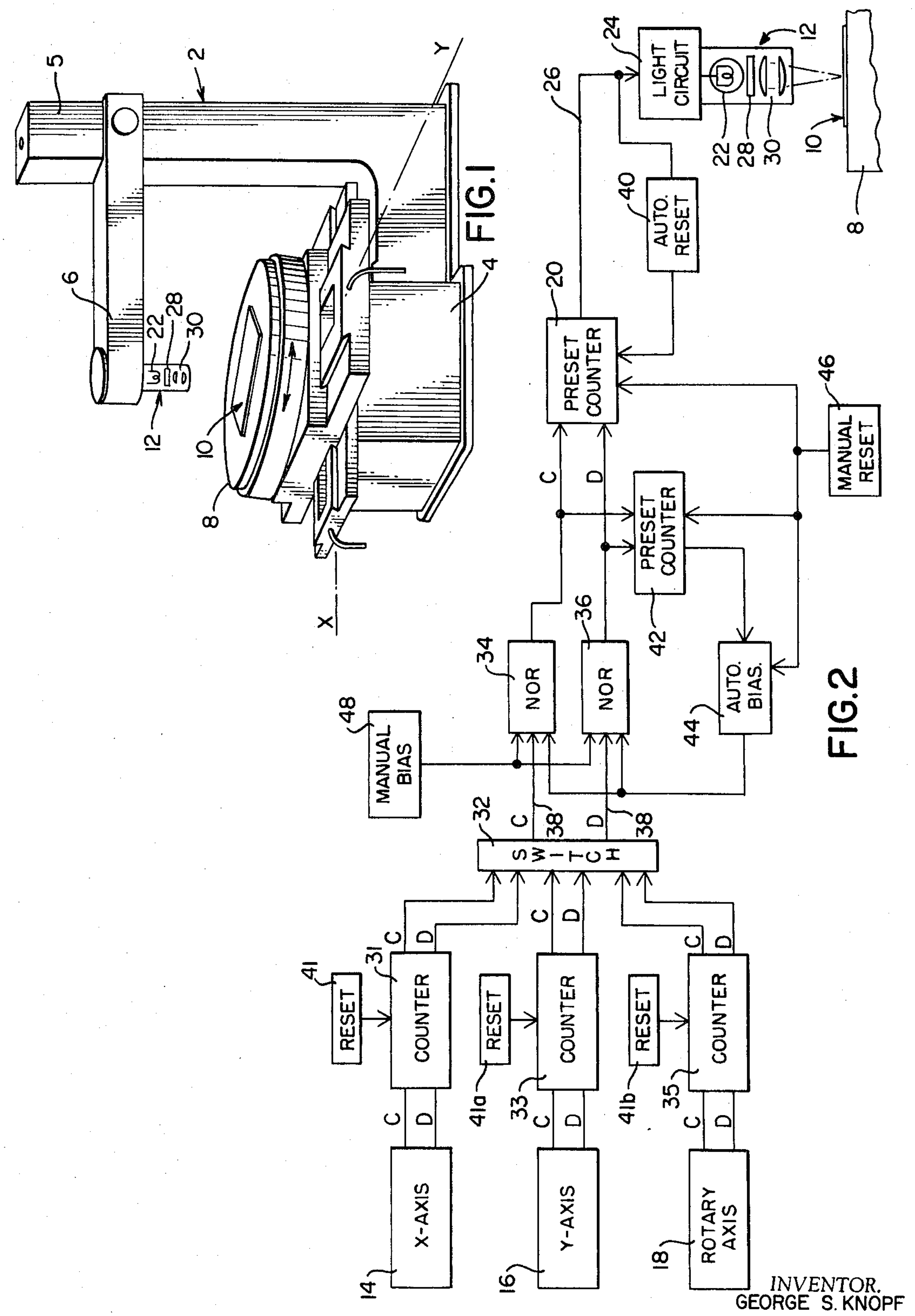
FIG 1 is a perspective view of an exemplary embodiment of the invention.
FIG 2 is a schematic diagram of a preferred electrical configuration of the invention.

In the exemplary embodiment of FIG 1, a supporting framework for the apparatus is shown generally as 2 having a base member 4, a vertical support 5 and an adjustable supporting arm 6. A table 8 is mounted on the base for movement in an X and Y linear direction and for rotary movement by drive mechanisms not shown. A member 10 having a photosensitive surface upon which the pattern is to be formed is adapted to be suitably secured to table 8. A high intensity source of light shown generally as 12, responsive to the movement of table 8 such that the frequency of illumination for exposure purposes is controllable, is mounted on arm 6. Although the exemplary embodiment of FIG. 1 shows the table having movement and the light source stationary, it is obvious that this invention will also apply when the table and photosensitive surface are stationary and the light source moves relative thereto.

The source of light 12 comprises a light element 22 capable of producing a high intensity, short duration, pulse of light, an opaque mask 28 having a predetermined aperture or reticle therein and an appropriate lens system 30. Thus, upon energization of element 22, the light passes through the aperture or reticle of mask 28 and the image thereof is focused on the photosensitive surface 10 for exposure of said surface. The size of any single image formed on the photosensitive surface may thus be controlled through the use of various apertures, lens systems, and relative height adjustment of the source of light above the photosensitive surface. Although a lens system is utilized in the exemplary embodiment, it is apparent that, if the mask was lowered to be substantially in contact with the photosensitive surface, direct exposure by the image could be obtained without the lens system.

A shield, not shown, covering member 10 and light source 12 is required to prevent unwanted exposure from ambient light of the photosensitive surface in the embodiment of FIG. 1.

A measuring system such as described in U.S. Pat. No. 2,886,718 to Shepherd et al. is incorporated with each axis of movement of table 8.

In the schematic diagram of FIG. 2, a measuring system of the aforementioned type is shown diagrammatically as 14, 16 and 18 mounted respectively for measurement of movement of table 8 in the X, Y, and rotary directions. Hence, any relative movement between table 8 and base 4 causes a similar relative movement between the gratings of the measuring system wherein electrical pulses are transmitted over leads C and D as described in the aforementioned patents. The three sets of lead lines C and D from 14, 16 and 18 provide electrical input to counters 31, 33 and 35. These counters are of a bidirection type and maintain a continuous count of the net number of positive or negative increments of movement of the table relative to the base. Individual manual reset circuits 41, 41*a* and 41*b*, are connected to each counter to permit resetting the individual counter to zero. The three sets of lead lines C and D from counters 31, 33, and 35 terminate in a switch 32 which allows selective transmission of the electrical pulses from the one system or axis in use over the single set 38 of lead line C and D. NOR gates 34 and 36 are interposed between the switch 32 and preset counters 20 and 42 for purposes to be explained below. Leads C and D in the present case correspond to leads C and D of the same aforementioned patent.

The preset counter 20 is a differential type counter which adds the pulses received over lead C and subtracts those received over lead D and provides an output pulse in response to the pulses received. The count at any time is therefore a measurement of the extent of the net movement of the table in one or the other of the two opposite directions along the axis of measurement. Counter 20 comprises a counting circuit and an adjustable preset circuit. The preset circuit of counter 20 establishes a pulse count range limit wherein the transmission of any output pulse over line 26 from counter 20 is prohibited until the preset number of input pulses has been counted. As an example, if the preset circuit is set at +N pulses, an output pulse from counter 20 would not occur until the net accumulation of input pulses over leads C and D equalled +N. Since the pulses over leads C and D are responsive to the relative movement of the gratings and the lines of the gratings are a constant incremental distance apart, the number and sign of the pulses are directly related to the linear movement of the table with respect to the base. The preset factor N is thus the net required number of increments of movement needed to transmit an output pulse from counter 20.

A reset circuit 40 responsive to signals on line 26 is connected to counter 20. Thus, each time an output pulse is transmitted on line 26, counter 20 is automatically reset to the zero count position so as to again be able to count the pulses over lines C and D from a zero reference count.

The output pulse from counter 20 is transmitted over line 26 to trigger the light source firing circuit 24 which causes light element 22 to flash. It is thus seen that each time an incremental distance equivalent to N is travelled by the table, a triggering signal is transmitted from counter 20 causing element 22 to flash.

Counter 42 operates in a manner similar to counter 20, in that pulses are received over lines C and D and that a preset circuit establishes the pulse count range limit. A preset factor M is the net required number of increments of movement of the table relative to the base needed to transmit an output signal from counter 42. The number set into the preset circuit establishes the length of the row of patterns imposed on photosensitive surface 10. Upon counting the preset number of pulses M, an output signal from counter 42 is transmitted to biasing member 44.

Member 44 is a conventional bistable multivibrator element which, when switched by the signal from counter 42, provides a biasing signal to NOR gates 34 and 36. Upon receipt of the biasing signal from member 44, gates 34 and 36 prevent the transmission of any pulses over lead lines C and D to counters 20 and 42. Further movement of the table with the NOR gates so biased will not provide any signals to trigger light element 22.

Member 44 is switched to its nontransmitting state upon receipt of a signal from manually operative reset member 46. The manual reset member 46 also provides a signal to reset counters 20 and 42 to the zero count position.

A manual operable biasing member 48 is provided to supply a separate biasing signal to NOR gates 34 and 36. During initial positioning of the photosensitive member 10, the operator activates member 48 to initially bias the NOR gates to prevent transmission of pulses to counters 20 and 42.

Gates 34 and 36 thus prohibit pulse transmissions to counters 20 and 42 when signals from either member 48 or 44 are present. If neither biasing signal is present the gates will pass pulses in lines C and D to counter 20 and 42.

Thus, in operation, a mask 28 having a predetermined aperture is mounted adjacent to light 22. Biasing member 48 is engaged to thereby provide a biasing signal to gates 34 and 36. With the gates in this nontransmitting state, photosensitive member 10 is secured to table 8 and prepositioned relative to light source 12. Counters 20 and 42 are reset to a zero count position through the use of reset member 46. The factor N, i.e. the increments of travel between exposures, is preset into counter 20 and the factor M, i.e. the increments of travel corresponding to a predetermined length of a row of patterns, is preset into counter 42. Switch 32 is positioned to allow transmission of pulses from the measuring system of the required axis of movement such as the X axis and biasing member 48 is switched off. Thus, any movement of the table in the X direction will cause pulses to be transmitted to differential counters 20 and 42. When the preset factor N pulses have been counted, a signal from counter 20 is transmitted to the firing circuit 24 causing the element 22 to flash whereby the configuration of the mask aperture or reticle is exposed on the photosensitive member. Counter 42 simultaneously records the total table movement in the X direction until a total of M increments has been achieved at which time a signal from counter 42 switches member 44 to its conducting state wherein gates 34 and 36 are biased to prohibit the passage of further pulses from the measuring system. While in this condition, the table 8 may be repositioned, switch 32 changed if necessary, masks changed, if desired, to obtain a new aperture configuration, or the preset function in the counter changed if required. When the system is again ready for operation, member 46 is used to reset the counters to zero and switch member 44 to its nonconducting state.

Thus it can be seen that the pattern produced on the photosensitive surface is of a uniform density since each exposure is of an extremely short duration from a high intensity source of light and each light pulse has a uniform or fixed amount of light. The problem of overexposure or underexposure because of nonuniform movement of the table is eliminated since the exposure is constant and the frequency of exposure is directly responsive to the relative distance moved by the photosensitive member.

While the form of apparatus herein described constitutes a preferred embodiment of the invention, it is to be understood that the invention is not limited to this precise form of apparatus, and that changes may be made therein without departing from the scope of the invention which is defined in the appended claims.

I claim:

1. Apparatus for producing at least one pattern having a uniform density upon a photosensitive surface relatively movable with respect to a light source by controlling the surface exposure rate independent of the relative speed of movement of the photosensitive surface comprising:

- a controllable light source;
- an opaque mask having a predetermined aperture therein operatively associated with said light source for transmission of light therethrough to the photosensitive surface;
- means supporting the photosensitive surface and said light source for relative movement therebetween;
- sensing means producing electrical input pulses in response to the relative movement;
- a first counter responsive to the electrical input pulses of said sensing means providing a controlled output electrical pulse for energization of said light source to provide momentary illumination of the photosensitive surface;
- a second counter responsive to the electrical input pulses of said sensing means providing a controlled output bias pulse;
- gate means operatively connected to said sensing means and to said first and said second counters and responsive to the output bias pulse of said second counter to prevent transmission of all electrical pulses through said gate means such that electrical input pulses resulting from continued relative movement between said photosensitive surface and said light source are not transmitted to said first counter; and
- means to reset said first and said second counters to zero count positions.

2. An apparatus as set forth in claim 1 in which said first counter further includes adjustable preset means for adjusting the frequency of said controlled output electrical pulse wherein a predetermined number of input pulses must be received and counted before an output pulse occurs; and reset means responsive to said first counter output electrical pulse operatively connected to said first counter for returning said counter to a zero count position upon transmission of said output pulse, whereby the frequency of illumination of said photosensitive surface is a function of the relative distance moved and is determined by the said adjustable preset means.

3. Apparatus for producing at least one pattern having a uniform density upon a photosensitive surface relatively movable with respect to a light source by controlling the illumination and exposure rate independent of the relative speed of movement of the photosensitive surface comprising:

a controllable light source;

an opaque mask having a predetermined aperture therein operatively associated with said light source for transmission of light therethrough to the photosensitive surface;

means supporting the photosensitive surface and said light source for relative movement therebetween;

means responsive to the relative movement producing a first signal indicating each increment of relative movement;

a counting mechanism operatively connected to said signal producing means for receiving and counting the signals; and said counting mechanism providing a controlled second signal for operation of said light source to provide momentary illumination of said photosensitive surface in response to predetermined increments of movement between the photosensitive surface and said light source to expose a precision pattern on said photosensitive surface.

4. Apparatus for producing at least one uniform density pattern upon a photosensitive surface comprising:

a controllable light source;

means for supporting the photosensitive surface and the said light source for relative movement therebetween;

means for sensing fixed increments of movement between said light source and the photosensitive surface;

resettable counting means, operatively associated with said sensing means, for counting the number of fixed increments of movement between said light source and the photosensitive surface, said counting means responsive to a predetermined sum of fixed increments to produce no output signal until said predetermined sum is reached and to both produce an output signal and reset itself to a zero count position when said predetermined sum is reached; and means responsive to said output signal momentarily energizing said light source to illuminate the photosensitive surface and thereby produce a uniform density pattern thereon.

5. The combination according to claim 4 wherein means are provided for producing relative movement between the photosensitive surface and said light source.

6. Apparatus for producing at least one uniform density pattern upon a photosensitive surface comprising:

a controllable light source;

means producing relative movement between the photosensitive surface and said light source; and means constructed to activate said light source only at equally spaced intervals activating means including means for counting the number of equal increments smaller than said intervals in relative movement between said photosensitive surface and said light source to determine said equal intervals and thereby produce a uniform density pattern on the photosensitive surface.

7. Apparatus for producing at least one uniform density pattern upon a photosensitive surface comprising:

a controllable light source;

means for producing relative movement between the photosensitive surface and said light source; and means sensing the amount of relative movement between the photosensitive surface and said light source during the time interval in which said photosensitive surface and said light source are moving relative to each other, and activating said light source at intervals separated by equal amounts of sensed relative movement between the photosensitive surface and said light source to thereby produce a uniform density pattern on the photosensitive surface.